(12) United States Patent
Kim (10) Patent No.: US 12,465,460 B2
(45) Date of Patent: Nov. 11, 2025

(54) MOUTHPIECE TYPE REMOVABLE ORTHODONTIC APPLIANCE

(71) Applicant: Han-Joon Kim, Hyogo (JP)

(72) Inventor: Han-Joon Kim, Hyogo (JP)

( * ) Notice: Subject to any disclaimer, the term of this patent is extended or adjusted under 35 U.S.C. 154(b) by 417 days.

(21) Appl. No.: 18/008,115

(22) PCT Filed: Jun. 3, 2021

(86) PCT No.: PCT/JP2021/021271
§ 371 (c)(1),
(2) Date: Dec. 3, 2022

(87) PCT Pub. No.: WO2021/246495
PCT Pub. Date: Dec. 9, 2021

(65) Prior Publication Data
US 2023/0270527 A1 Aug. 31, 2023

(30) Foreign Application Priority Data
Jun. 3, 2020 (JP) ................................. 2020-096976

(51) Int. Cl.
*A61C 7/12* (2006.01)
*A61C 7/08* (2006.01)
*A61C 7/36* (2006.01)

(52) U.S. Cl.
CPC .................. *A61C 7/08* (2013.01); *A61C 7/12* (2013.01); *A61C 7/36* (2013.01); *A61C 2201/007* (2013.01)

(58) Field of Classification Search
CPC .............. A61C 7/36; A61C 7/08; A61C 7/146
See application file for complete search history.

(56) References Cited

U.S. PATENT DOCUMENTS 7,819,661 B2    10/2010  Nadav
9,554,875 B2 *   1/2017  Gualano ................ A61C 7/285
(Continued)

FOREIGN PATENT DOCUMENTS

JP    2008-532563 A    8/2008
JP    2015-150179      8/2015
(Continued)

OTHER PUBLICATIONS

PCT/ISA/210 for PCT/JP2021/021271.
(Continued)

*Primary Examiner* — Eric J Rosen
*Assistant Examiner* — Adriena J Webb Lyttle
(74) *Attorney, Agent, or Firm* — Smith, Gambrell & Russell, LLP.

(57) ABSTRACT

Improvement is required in many aspects in order to enhance a treatment effect by reliably applying necessary orthodontic force for moving teeth. The present invention provides a mouthpiece type removable orthodontic appliance including a base portion (10), and a fitting portion (20) provided on the base portion. The base portion (10) is a thin plate formed of an inelastic material and extending along the shape of an occlusal surface of a dental arch of a jaw on which the orthodontic appliance is fitted. The fitting portion (20) includes a movement member (30, 40) to be fitted on a tooth intended to be moved, and a gripping member (50, 60) to be fitted on a tooth unintended to be moved. The movement member includes an orthodontic tooth surface pad pair including two orthodontic tooth surface pads conforming to a post-movement position and state of a tooth crown surface of the intended tooth, and an orthodontic resilient member for applying an orthodontic force and a gripping force to the tooth surface pad pair. The gripping member includes a gripping tooth surface pad pair including two gripping tooth (Continued)

surface pads for covering a tooth crown surface of the unintended tooth, and a gripping resilient member for applying a gripping force to the gripping tooth surface pad pair.

9 Claims, 8 Drawing Sheets

(56) References Cited

U.S. PATENT DOCUMENTS

| | | | |
|---|---|---|---|
| 10,588,717 B2 * | 3/2020 | Chun | A61C 7/06 |
| 10,828,131 B2 | 11/2020 | Veis | |
| 11,406,477 B2 | 8/2022 | Ando | |
| 11,517,403 B2 | 12/2022 | Veis | |
| 2010/0129763 A1 * | 5/2010 | Kuo | A61C 7/08 |
| | | | 128/861 |
| 2016/0310237 A1 | 10/2016 | Hung | |
| 2017/0007368 A1 * | 1/2017 | Boronkay | A61C 7/08 |
| 2021/0077228 A1 * | 3/2021 | Ando | A61C 7/08 |

FOREIGN PATENT DOCUMENTS

| | | | |
|---|---|---|---|
| JP | 3200778 | 10/2015 | |
| JP | 6029220 | 10/2016 | |
| JP | 2016-202921 | 12/2016 | |
| JP | 2018-505016 A | 2/2018 | |
| KR | 10-1744000 B1 | 5/2017 | |
| WO | 2005/000145 | 1/2005 | |
| WO | WO-2011049719 A2 * | 4/2011 | A61C 8/0013 |
| WO | 2020/170300 | 8/2020 | |

OTHER PUBLICATIONS

Written Opinion of the ISA (PCT/ISA/237 for PCT/JP2021/021271).

Notice of Reasons for Refusal mailed relative to Japanese Patent Application No. 2022-528896, Apr. 11, 2024 (3 pages Japanese, 3 pages English translation).

* cited by examiner

MOUTHPIECE TYPE REMOVABLE ORTHODONTIC APPLIANCE

TECHNICAL FIELD

The present invention relates to a mouthpiece type removable orthodontic appliance to be used for moving teeth in an orthodontic field.

BACKGROUND ART

In the field of orthodontic treatment for repositioning and reorienting patient's teeth in three-dimensionally ideal locations and states to arrange patient's tooth alignment and occlusion suitably for each individual patient's face profile and oral function, a mainstream treatment method is a multibracket treatment method in which the teeth are moved by attaching brackets on surfaces of the teeth, and ligating the brackets with an elastic wire or sliding the brackets along a strong wire. However, the patient needs to keep wearing a fixed orthodontic appliance including the brackets, the wire and the like in his or her mouth for a treatment period of as long as two to three years. Therefore, food debris is liable to be accumulated around the orthodontic appliance, so that the patient has a risk of tooth decay and gum inflammation. Further, the orthodontic appliance is liable to be seen when the patient laughs and speaks. In addition, the patient is liable to feel inconvenient or uncomfortable when eating and speaking. These problems pose a heavy burden on the patient when the treatment is started and carried out.

Further, a conventional removable orthodontic appliance can deal with slight and limited movement of teeth only in a mixed dentition period of childhood. However, the removable orthodontic appliance fails to provide a treatment effect such as provided by a currently available multibracket system which is adapted to entirely three-dimensionally reposition permanent teeth in harmony with a patient's jaw face profile.

In recent years, a mouthpiece type orthodontic treatment method has been put into practice, in which a plurality of mouthpieces (e.g., 70 to 80 mouthpieces) having different profiles adapted for slight movement of teeth are prepared by CAD/CAM with the use of digital dental arch form information and fitted one after another on the teeth for moving the teeth.

However, the conventional mouthpiece type removable orthodontic appliance can solve the problems associated with the multibracket system, but requires further improvement in many aspects in order to enhance the treatment effect by reliably applying necessary orthodontic forces for efficiently and precisely moving the teeth.

RELATED ART DOCUMENT

Patent Document

PTL 1: Japanese Patent No. 6029220
PTL 2: Japanese Utility Model No. 3200778

SUMMARY OF INVENTION

Problem to be Solved by Invention

In the conventional removable orthodontic appliance such as the mouthpiece type orthodontic appliance, forces antagonistic to the orthodontic forces are exerted on the teeth supporting the appliance and, therefore, it is impossible to apply orthodontic forces having magnitudes greater than the retention limit magnitudes of the appliance-supporting teeth. This is because, if the orthodontic forces having magnitudes greater than the retention limit magnitudes are applied, the appliance is detached from the teeth, and cannot be used in the patient's mouth. Therefore, the conventional removable orthodontic appliance has limitations in the number and the movement amounts of the teeth to be moved at a time. This tends to prolong the treatment period, because the teeth are moved little by little. Particularly, the mouthpiece type orthodontic appliance is not adapted to adjust the orthodontic forces, but includes the multiplicity of appliances to be replaced one after another to apply the orthodontic forces for moving the teeth. Therefore, it is necessary to prepare the multiplicity of appliances, thereby posing problems of the treatment period and the appliance preparation costs.

Since the conventional mouthpiece type orthodontic appliance is thin and is formed of a homogeneous material, the middle portion (which covers the occlusal surfaces of the teeth) and the edge portions (which cover tooth necks) of the appliance are different in strain and deformation amount and, hence, in elastic force. This results in variations in orthodontic forces to be applied to the teeth. Particularly, the edge portions are liable to be deformed by repeated attachment and detachment of the appliance, making it difficult to sustainably apply sufficient orthodontic forces. Further, the conventional mouthpiece type orthodontic appliance covers the entire occlusal surfaces of the teeth and, therefore, positions of contact between upper and lower mouthpiece type orthodontic appliances or positions of contact between either of the upper and lower mouthpiece type orthodontic appliances and teeth opposed to the appliance are not considered as physiologically proper positions. Therefore, the occlusal forces are liable to be unevenly exerted on the appliances due to a non-physiological positional relationship between the upper and lower dental arches. Accordingly, there is a risk of undesired tooth movement due to a strain occurring in the entire appliances, or a risk of displacement of the lower jaw.

In view of the foregoing, it is an object of the present invention to provide a novel mouthpiece type removable orthodontic appliance which is capable of applying orthodontic forces to teeth intended to be moved via tooth surface pads and reliably applying sufficient orthodontic forces to the individual teeth.

Solution to Problem

According to the present invention, there is provided a mouthpiece type removable orthodontic appliance based on a predicted post-movement dentition prepared from digital three-dimensional information of a patient's dental arch form, the mouthpiece type removable orthodontic appliance including: a movement member which includes a pair of tooth surface pads formed of an elastic material having a desired elasticity and conforming to a post-movement position and state of a surface of a tooth crown of a tooth intended to be moved, for covering front and back sides (labial and lingual sides) or lateral sides (buccal and lingual sides) of the tooth crown of the intended tooth, and is adapted to move the intended tooth into the post-movement position and state for orthodontic treatment by holding the intended tooth between the tooth surface pads before the movement; a gripping member which includes a pair of tooth surface pads conforming to a surface of a tooth crown of a tooth unintended to be moved, for covering front and back sides (labial and lingual sides) or lateral sides (buccal and lingual sides) of the tooth crown of the unintended tooth, and is adapted to grip the unintended tooth in a current state by holding the unintended tooth between the tooth surface pads; and a base portion to which the movement member and the gripping member are attached, the base portion being formed of an inelastic material in a U-shape (horseshoe-shape) extending along the dental arch form.

Effect of Invention

Teeth are each held between the tooth surface pads which are adapted to apply a force to the tooth surface, whereby an orthodontic force can be generated for three-dimensional tooth gripping and movement. An elastic material and a plate spring standardized for each individual patient are used in combination, thereby making it possible to three-dimensionally individually move the patient's teeth.

Further, metal components to be incorporated in the orthodontic appliance are all specified and standardized, and such a metal component is incorporated in a position out of contact with the teeth, or is coated with a nonmetal material so as not to be exposed in the patient's mouth. Thus, the patient can receive the orthodontic treatment even if having metal allergy.

The teeth are each held between the two tooth surface pads (the pair of tooth surface pads) to be gripped, and moved to be three-dimensionally repositioned and reoriented. At this time, the elastic material and the plate spring are properly selected to be used in combination for the tooth surface pads. Thus, the tooth surface pads can be adjusted so that a necessary and sufficient orthodontic force can be applied to each tooth via the tooth surface pads. Further, the elastic material and the plate spring make it possible to precisely apply the orthodontic force to the tooth in a sustainable and stable manner, thereby achieving the three-dimensional tooth movement and gripping.

Further, a plate spring connected to the tooth surface pads may be made of a shape memory alloy. In this case, the appliance is fitted in the patient's mouth in a cold state, and then restored in shape by the patient's body temperature to be thereby firmly fitted on the tooth surfaces. Thus, the tooth surface pads can be efficiently used to three-dimensionally firmly cover the tooth surfaces without any limitations in attachment and detachment of the appliance even if the appliance is applied to any of various irregular tooth shapes or irregular dental arch forms.

Furthermore, an occlusal surface in contact with the mouthpiece type orthodontic appliance is set to be physiologically correctly positioned and configured, thereby preventing unnecessary orthodontic forces from being applied to the mouthpiece type orthodontic appliance. Thus, the upper and lower dental arch positions and the lower jaw position can be maintained in proper positions by proper occlusal forces during the orthodontic treatment.

DESCRIPTION OF EMBODIMENTS

Embodiments of the present invention will hereinafter be described in detail.

First Embodiment

According to one embodiment of the present invention, a mouthpiece type removable orthodontic appliance based on a predicted post-movement dentition prepared from digital three-dimensional information of a patient's dental arch form is provided, which includes: a movement member which includes a pair of tooth surface pads formed of an elastic material having a desired elasticity and conforming to a post-movement position and state of a surface of a tooth crown of a tooth intended to be moved, for covering front and back sides (labial and lingual sides) or lateral sides (buccal and lingual sides) of the tooth crown of the intended tooth, and is adapted to move the intended tooth into the post-movement position and state for orthodontic treatment by holding the intended tooth between the tooth surface pads before the movement; a gripping member which includes a pair of tooth surface pads conforming to a surface of a tooth crown of a tooth unintended to be moved, for covering front and back sides (labial and lingual sides) or lateral sides (buccal and lingual sides) of the tooth crown of the unintended tooth, and is adapted to grip the unintended tooth in a current state by holding the unintended tooth between the tooth surface pads; and a base portion to which the movement member and the gripping member are attached, the base portion being formed of an inelastic material in a U-shape (horseshoe-shape) extending along the patient's dental arch form.

In this embodiment, the orthodontic appliance has a double layer structure such that the movement member adapted to hold each tooth between the tooth surface pads formed of the elastic material (e.g., silicone or the like) having a desired elasticity and the gripping member are attached to the base portion formed of the inelastic material. The tooth surface pads mainly cover the outer side and the inner side (i.e., the labial side and the lingual side or the buccal side and the lingual side) of the tooth crown. The tooth surface pads cover the tooth including the mesial side and the distal side of the tooth as widely as possible without hindering the movement of the tooth so as to three-dimensionally move and grip the tooth. As required, the tooth surface pads may be adapted to apply a depressing force from the occlusal surface of the tooth crown and increase a support force (gripping force) of the appliance with respect to the occlusal force by covering the incision edge or the occlusal surface of the tooth crown to increase the coverage area.

The conventional mouthpiece type orthodontic appliance, which is formed of a single material, receives a force (counterforce) antagonistic to a tooth-moving orthodontic force to be thereby entirely distorted or deformed, failing to apply a sufficient orthodontic force to the tooth intended to be moved. Rather, the force is applied to a tooth next to the intended tooth, so that the tooth unintended to be moved is liable to be undesirably moved due to the counterforce.

In the present invention, the mouthpiece type orthodontic appliance has a double layer structure such that the base portion is provided as a firm base and supports movement members and gripping members. Thus, orthodontic forces having different magnitudes can be respectively applied in different directions to individual teeth as required by the individual teeth. Further, counterforces of the orthodontic forces applied to the respective teeth are absorbed by the base portion, thereby minimizing the undesirable exertion of the orthodontic forces on the neighboring teeth.

The orthodontic forces can be three-dimensionally changed so as to provide different holding forces, i.e., different movement amounts and different movement directions, by attaching tooth surface pads each having a desired thickness and a desired shape and formed of a desired material to the base portion. Thus, target teeth can be reliably moved to desired three-dimensional positions and orientations. The tooth surface pads may be prepared in pair for each tooth, and may be attachable and detachable in pair with respect to the base portion. The tooth surface pads are not necessarily required to be provided in pair, but may be separately attachable and detachable with respect to the base portion. Further, the gripping member may be prepared as including a set of consecutive tooth surface pads for a tooth row including a plurality of neighboring teeth unintended to be moved.

With reference to the drawings, the present invention will hereinafter be described more specifically.

Figure 1:
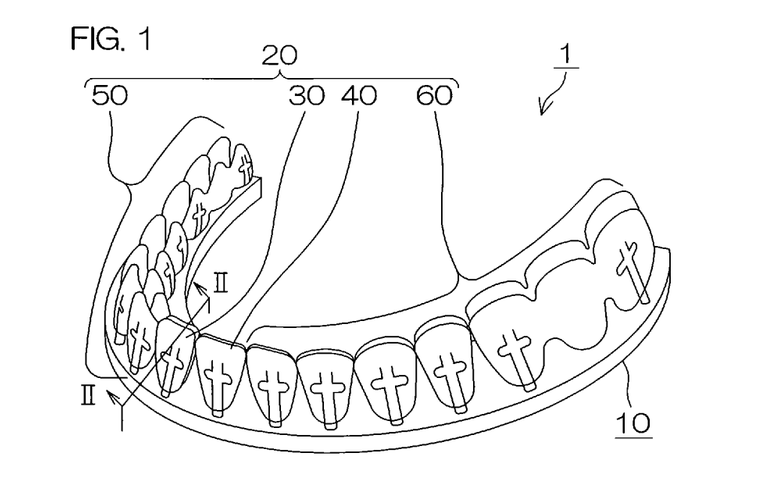
FIG. 1 is a perspective view of a mouthpiece type removable orthodontic appliance 1 according to one embodiment.

FIG. 1 is a perspective view of a mouthpiece type removable orthodontic appliance 1 according to one embodiment. The orthodontic appliance 1 is an appliance to be fitted on a permanent tooth arch of an upper jaw by way of example.

The orthodontic appliance 1 includes a base portion 10 and a fitting portion 20. The base portion 10 is formed of a rigid resin or a metal such as titanium, i.e., an inelastic material. The base portion 10 is a thin plate having a U-shape (horseshoe shape) extending along the shape of the occlusal surface of the permanent tooth arch of the upper jaw as seen in plan. In FIG. 1, the upper surface of the base portion 10 serves as a fitting surface, and the lower surface of the base portion 10 serves as the occlusal surface. The fitting portion 20 is mounted on the fitting surface (upper surface).

The fitting portion 20 includes movement members 30, 40 and gripping members 50, 60.

This embodiment will be described assuming that the movement members 30, 40 respectively conform to upper central incisors (first upper right tooth and first upper left tooth), and the gripping members 50, 60 respectively conform to tooth rows of remaining teeth (second to eighth upper right teeth and second to eighth upper left teeth) by way of example.

As shown in FIG. 1, the gripping member 60 is not necessarily required to be configured so that independent pairs of tooth surface pads are respectively provided for seven teeth (second to eighth upper left teeth), but may be configured so that one pair of tooth surface pads is provided for a tooth row including a given number of consecutive teeth (e.g., three consecutive teeth), e.g., the sixth, seventh and eighth upper left teeth (first molar, second molar and third molar). The gripping member 50 may have the same configuration.

Figure 2:
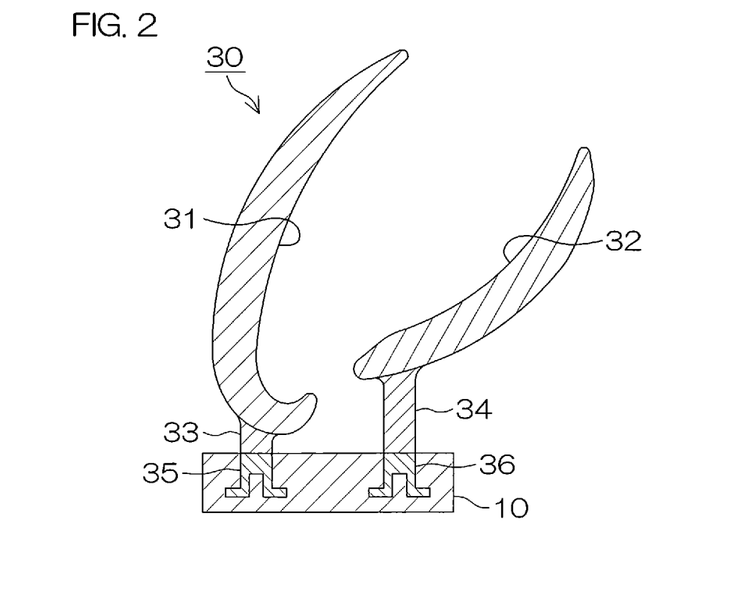
FIG. 2 is a schematic diagram showing a sectional surface taken along a line II-II in FIG. 1.

FIG. 2 is a schematic diagram showing a sectional surface taken along a line II-II in FIG. 1. Referring to FIGS. 1 and 2, the movement member 30 for the upper central incisor (first upper right tooth) includes a pair of tooth surface pads 31, 32 conforming to the tooth crown surface of the first upper right tooth. That is, the pair of tooth surface pads 31, 32 is a set of two tooth surface pads including a tooth surface pad 31 for covering the front side (labial side) of the tooth crown of the first upper right tooth, and a tooth surface pad 32 for covering the back side (lingual side) of the tooth crown of the first upper right tooth. The pair of tooth surface pads 31, 32 may conform to the shape of the tooth crown so as to cover the tooth crown including the mesial side and the distal side of the tooth as widely as possible. The tooth surface pads 31, 32 may be formed of a silicone resin by way of example.

The tooth surface pads 31, 32 provided in pair are respectively supported by support members 33, 34 so as to conform to the post-movement position and state of the tooth crown surface of the tooth (first upper right tooth) intended to be moved. The support members 33, 34 are respectively provided with attachment portions 35, 36. The tooth surface pads 31, 32 are attached to the base portion 10 by the support members 33, 34 and the attachment portions 35, 36 so as to be located at three-dimensionally unique positions. The support members 33, 34 may be provided integrally with the tooth surface pads 31, 32, respectively. Further, the support members 33, 34 may be formed of a silicone resin by way of example.

Figure 3:
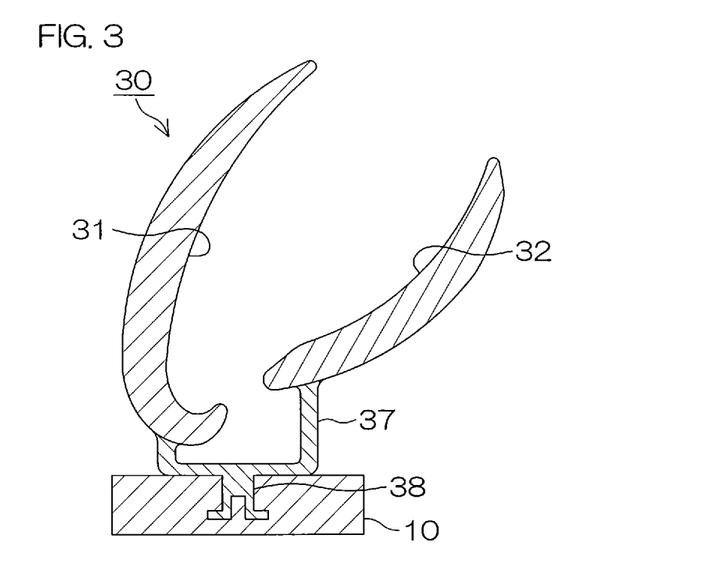
FIG. 3 is a schematic diagram showing an exemplary modification of a movement member 30 attached to a base portion 10 shown in FIG. 2.

As shown in FIG. 3, the pair of tooth surface pads 31, 32 may be commonly supported by a single support member 37. In this case, the support member 37 is provided with an attachment portion 38. The tooth surface pads 31, 32 are attached to the base portion 10 by the support member 37 and the attachment portion 38 so as to be located at three-dimensionally unique positions.

Figure 4:
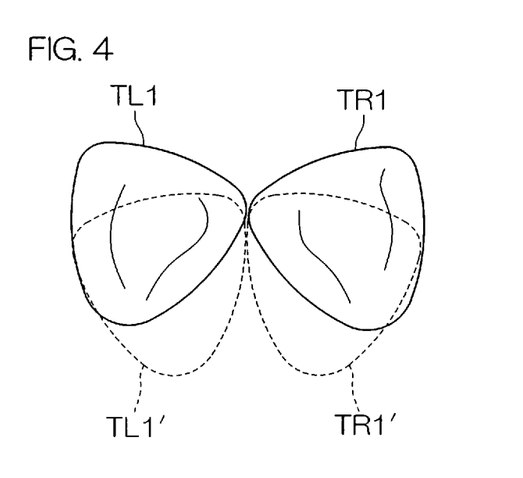
FIG. 4 is a schematic diagram of two central incisors of an upper jaw intended to be moved as viewed from the lower side, indicating pre-movement positions and states thereof (solid line) and post-movement positions and states thereof (broken line).

FIG. 4 is a schematic diagram of the upper central incisors (first upper right tooth TR1 and first upper left tooth TL1) intended to be moved in this embodiment as viewed from the lower side. In FIG. 4, the upper central incisors (first upper right tooth and first upper left tooth) in a pre-movement position and state are respectively indicated by TR1 and TL1 in solid line, and the upper central incisors (first upper right tooth and first upper left tooth) in a post-movement position and state are respectively indicated by TR1' and TL1' in broken line.

In this embodiment, the set of two tooth surface pads 31, 32 (the pair of tooth surface pads 31, 32) is provided so as to conform to the post-movement position and state of the tooth crown surface of the tooth intended to be moved (first upper right tooth). A set of two tooth surface pads 41, 42 (a pair of tooth surface pads 41, 42) is provided so as to conform to the post-movement position and state of the tooth crown surface of the tooth intended to be moved (first upper left tooth).

Figure 5:
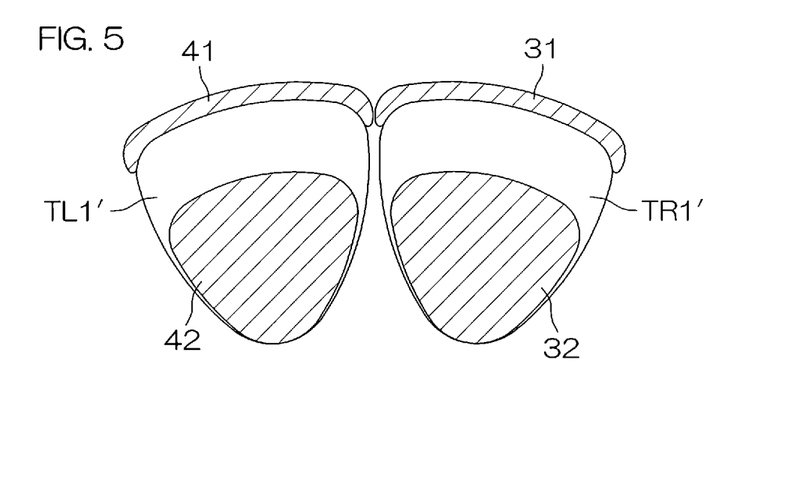
FIG. 5 is a schematic diagram showing a relationship between the two central incisors of the upper jaw and the tooth surface pads after the movement.
Figure 6:
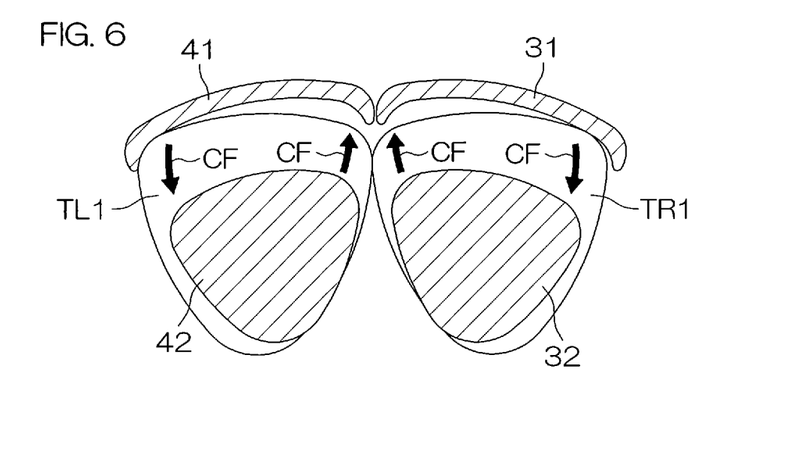
FIG. 6 is a schematic diagram showing a relationship between the two central incisors of the upper jaw and the tooth surface pads before the movement.

Therefore, as shown in FIG. 5, the tooth surface pads 31, 32 conform to the first upper right tooth TR1' after the movement, and the tooth surface pads 41, 42 conform to the first upper left tooth TL1' after the movement. Before the movement, as shown in FIG. 6, the first upper right tooth TR1 is held between the tooth surface pads 31, 32 and the first upper left tooth TL1 is held between the tooth surface pads 41, 42, whereby orthodontic forces CF are continuously applied to the first upper right tooth and the first upper left tooth to three-dimensionally move these teeth into the post-movement positions and states.

Stepwise movement models (movement members each including a pair of tooth surface pads) may be prepared instead of the movement member including the pair of tooth surface pads conforming to the post-movement final position and final state of the tooth crown surface of the tooth intended to be moved. That is, the movement members are each prepared as including a pair of tooth surface pads conforming to a tooth crown position and state to be obtained after each movement step, and are attached to the base portion 10 one after another, whereby the orthodontic force can be adjusted to properly move the intended tooth into the desired position and state stepwise.

In this embodiment, the movement member 30 may be configured to include the elastic material. For example, the movement member 30 may be formed of a material mainly containing silicone. The tooth surface pads 31, 32 and the attachment portions 35, 36, 38 may be formed as having a relatively low elasticity, and the support members 33, 34, 37 may be formed as having a relatively high elasticity and a relatively high resilience. Further, the movement member 30 is not necessarily required to be entirely formed of the same material, but the tooth surface pads 31, 32, the attachment portions 35, 36, 38, and the support members 33, 34, 37 may be formed of different materials and combined together.

The movement member 40 may be configured to include the same elastic material as the movement member 30.

The gripping members 50, 60 respectively conform to the tooth row of the second to eighth upper right teeth and the tooth row of the second to eighth upper left teeth. The gripping members 50, 60 may be each configured so that plural sets of two tooth surface pads (plural pairs of tooth surface pads) each including a tooth surface pad for covering the outer side (the labial side or the buccal side) of a tooth crown and a tooth surface pad for covering the inner side (the lingual side) of the tooth crown are independently provided for the respective teeth, or may be each configured so that tooth surface pads for covering the outer side (the labial side or the buccal side) of consecutive tooth crowns are connected to one another and tooth surface pads for covering the inner side (the lingual side) of the consecutive tooth crowns are connected to one another. In FIG. 1, the configuration including the connected tooth surface pads is shown by way of example.

The mouthpiece type removable orthodontic appliance according to this embodiment may be produced directly from digital three-dimensional information of a patient's dental arch form by CAD/CAM. Alternatively, the mouthpiece type removable orthodontic appliance may be produced on a predicted post-movement dentition model prepared from the three-dimensional information of the patient's dental arch form by CAD/CAM.

Second Embodiment

According to a second embodiment of the present invention, a mouthpiece type orthodontic appliance based on a predicted post-movement dentition prepared from digital three-dimensional information of a patient's dental arch form is provided, which includes: a movement member which includes two tooth surface pads (a pair of tooth surface pads) conforming to a post-movement position and state of a surface of a tooth crown of a tooth intended to be moved, for covering front and back sides (labial and lingual sides) or lateral sides (buccal and lingual sides) of the tooth crown of the intended tooth, and is adapted to move the intended tooth into the post-movement position and state for orthodontic treatment by holding the intended tooth between the tooth surface pads before the movement; and a gripping member which includes two tooth surface pads (a pair of tooth surface pads) conforming to a surface of a tooth crown of a tooth unintended to be moved, for covering front and back sides (labial and lingual sides) or lateral sides (buccal and lingual sides) of the tooth crown of the unintended tooth, and is adapted to grip the unintended tooth in a current state by holding the unintended tooth between the tooth surface pads; wherein the tooth surface pads of the movement member are supported in a predetermined positional relationship by a resilient member of an alloy material including a resilient shape memory alloy, and an orthodontic force applied by the movement member can be adjusted by selectively attaching the resilient member. The mouthpiece type orthodontic appliance further includes a base portion to which the movement member and the gripping member are attached, the base portion being formed of a non-resilient material in a U-shape (horseshoe-shape) extending along the patient's dental arch form.

It is difficult to precisely adjust the magnitude and the direction of the necessary orthodontic force to be applied with the use of a material conventionally used for the mouthpiece type orthodontic appliance, such as vinyl material, elastic silicone material, silicone rubber, elastic resin, and thin resin material. That is, it is impossible to apply all the necessary orthodontic force in the necessary direction without limitations by adjusting the thickness and the shape of the material.

In this embodiment, therefore, the tooth surface pads are formed of an inelastic material, and the magnitudes and the directions of the orthodontic force and the gripping force to be generated and applied to the tooth surface pads for holding the tooth between the tooth surface pads can be adjusted as desired by the resilient member of the alloy material including the shape memory alloy. That is, the two tooth surface pads are configured so as to be connected to each other by a metal coil or a spring, like a clothespin, for holding the tooth by the resilient force of the metal. According to the necessary orthodontic force, the resilient member is selected from plural types of metal resilient members preliminarily and precisely standardized for predetermined generatable orthodontic forces, whereby the two pads can apply the gripping force and the orthodontic force necessary and sufficient for firmly holding the tooth therebetween in close contact with the tooth surface. This allows for more reliable and precise three-dimensional movement of the tooth. Further, the appliance can be stably retained (supported and maintained).

The tooth surface pads cover the tooth surface including the labial and lingual sides (or the buccal and lingual sides) and the mesial and distal sides of the tooth as widely as possible without hindering the movement of the tooth so as to three-dimensionally move the tooth. As required, the tooth surface pads may be adapted to apply a depressing force from the occlusal surface and increase the support force (gripping force) of the appliance with respect to the occlusal force by covering the incision edge or the occlusal surface to increase the coverage area.

A resilient member capable of generating a desired orthodontic force may be selected from existing resilient members such as resilient wires and springs to attach the tooth surface pads to the base portion, whereby the orthodontic force and the gripping force can be adjusted. In addition, the shapes and the thicknesses of the tooth surface pads to be attached to the base portion may be changed to increase the orthodontic force and adjust the movement direction.

In this embodiment, the resilient member of the material such as the shape memory alloy deformable depending on the temperature is utilized for the retention of the tooth surface pads and the generation of the orthodontic force, whereby the tooth surface pads can be configured so as to cover a greater area of the tooth including an undercut of a bulged tooth portion. Thus, the orthodontic force can be reliably three-dimensionally applied to the tooth to precisely move or grip the tooth.

For example, the orthodontic appliance is cooled with cold water for attachment and detachment thereof. Thus, the resilient member of the shape memory alloy material can be improved in shape adaptability and flexibility, making it easier to attach and detach the appliance with respect to any patient's tooth alignment. After the attachment of the appliance, the resilient member of the shape memory alloy is restored to its original position and shape in the patient's mouth by the body temperature, whereby a predetermined orthodontic force and a predetermined gripping force are generated. Thus, the orthodontic appliance can be firmly retained on the teeth by the gripping member to be thereby stably maintained in a predetermined position in the patient's mouth. Therefore, the appliance is not detached from the teeth by a counterforce to the orthodontic force applied to the teeth. When the appliance is to be detached from the teeth, cold water is put in the patient's mouth for easy detachment.

The resilient member of the shape memory alloy for the gripping member and the resilient member of the shape memory alloy for the movement member may have different setting temperatures so that the resilient member for the gripping member can be more quickly restored to its original shape in the patient's mouth. Thus, the appliance is first fixed in a predetermined position by the gripping member, and then the movement member covers the tooth. This reduces the fitting position error of the appliance, making it possible to reliably and precisely apply the desired orthodontic force to the tooth intended to be moved.

Where the tooth does not have a significant bulge, the resilient member such as the plate spring or the resilient wire of an ordinary alloy may have an inclined shape such that the edge portions of the pads can be easily removably fitted to the tooth neck in the attachment and the detachment of the appliance. Therefore, the resilient member of the shape memory alloy and the resilient member of the ordinary alloy generally used for the orthodontics may be used in combination for preparation of the gripping member and the movement member. For example, the resilient member of the ordinary alloy may be used for the gripping member, serving as an attachment/detachment guide of the appliance for easily defining the fitting position and the direction in the attachment and the detachment of the appliance.

Thus, the tooth can be moved and gripped via the tooth surface pads sufficiently covering the tooth without any limitations associated with difficulty in the attachment and the detachment of the appliance due to the bulge and the orientation of the tooth. The resilient member formed of the alloy including the shape memory alloy is used for the movement of the tooth and the generation of the gripping force, whereby the removable orthodontic appliance is capable of properly and sufficiently generating the orthodontic force and the gripping force necessary for the generation of the orthodontic force, and allows for smooth attachment and detachment.

The second embodiment will hereinafter be described more specifically with reference to the drawings.

Figure 7:
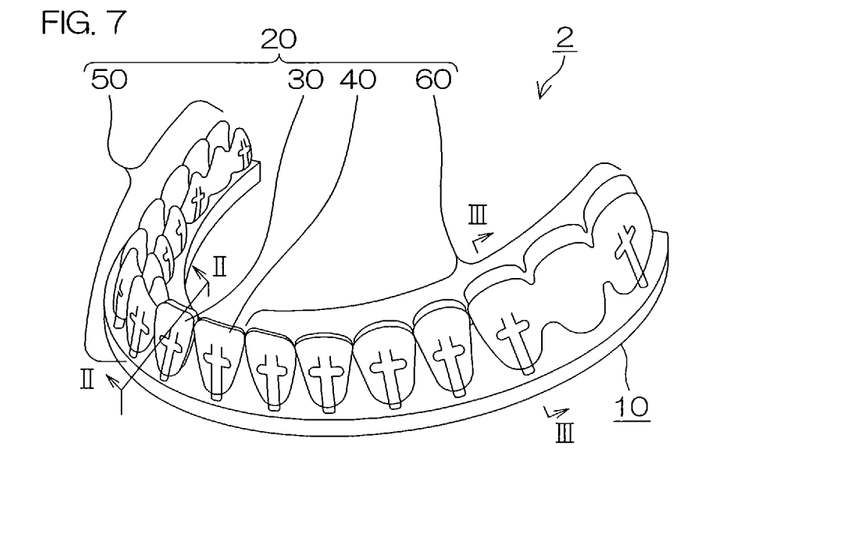
FIG. 7 is a perspective view of a mouthpiece type removable orthodontic appliance 2 according to another embodiment.

FIG. 7 is a perspective view of a mouthpiece type removable orthodontic appliance 2 according to the second embodiment. The orthodontic appliance 2 is an appliance to be fitted on a permanent tooth arch of an upper jaw by way of example.

The orthodontic appliance 2 basically includes a base portion 10 and a fitting portion 20, like the orthodontic appliance 1 described with reference to FIG. 1.

The base portion 10 is formed of a rigid resin or a metal such as titanium, i.e., an inelastic material. The base portion 10 is a thin plate having a U-shape (horseshoe shape) extending along the shape of the occlusal surface of the permanent tooth arch of the upper jaw as seen in plan. In FIG. 7, the upper surface of the base portion 10 serves as a fitting surface, and the lower surface of the base portion 10 serves as an occlusal surface. The fitting portion 20 is mounted on the fitting surface (upper surface).

The fitting portion 20 includes movement members 30, 40 and gripping members 50, 60.

This embodiment will be described assuming that the movement members 30, 40 respectively conform to upper central incisors (first upper right incisor and first upper left incisor), and the gripping members 50, 60 respectively conform to the tooth rows of remaining teeth (second to eighth upper right teeth and second to eighth upper left teeth) by way of example.

As shown in FIG. 7, the gripping member 60 is not necessarily required to be configured so that independent pairs of tooth surface pads are respectively provided for seven teeth (second to eighth upper left teeth), but may be configured so that one pair of tooth surface pads is provided for a tooth row including a given number of consecutive teeth (e.g., three consecutive teeth), e.g., the sixth, seventh and eighth upper left teeth (first molar, second molar and third molar). The gripping member 50 may have the same configuration.

Figure 8:
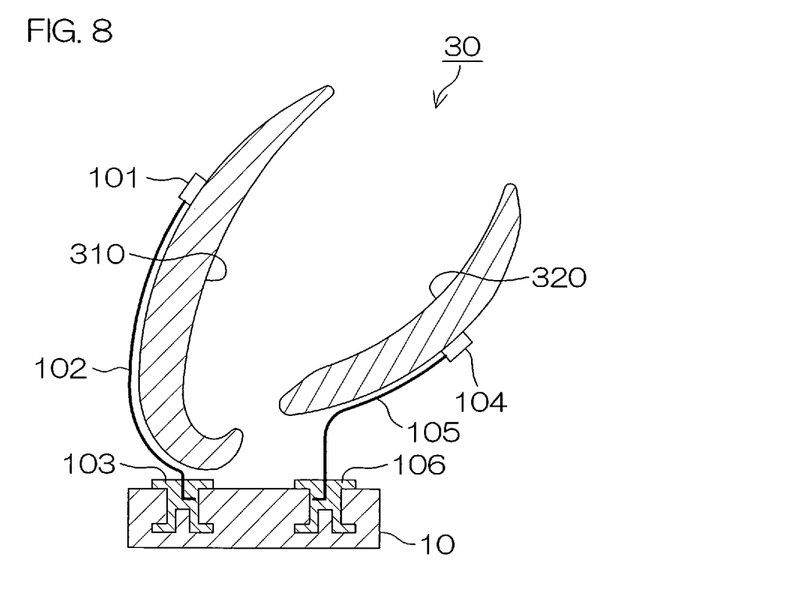
FIG. 8 is a schematic diagram showing a sectional surface taken along a line II-II of FIG. 7.
Figure 9:
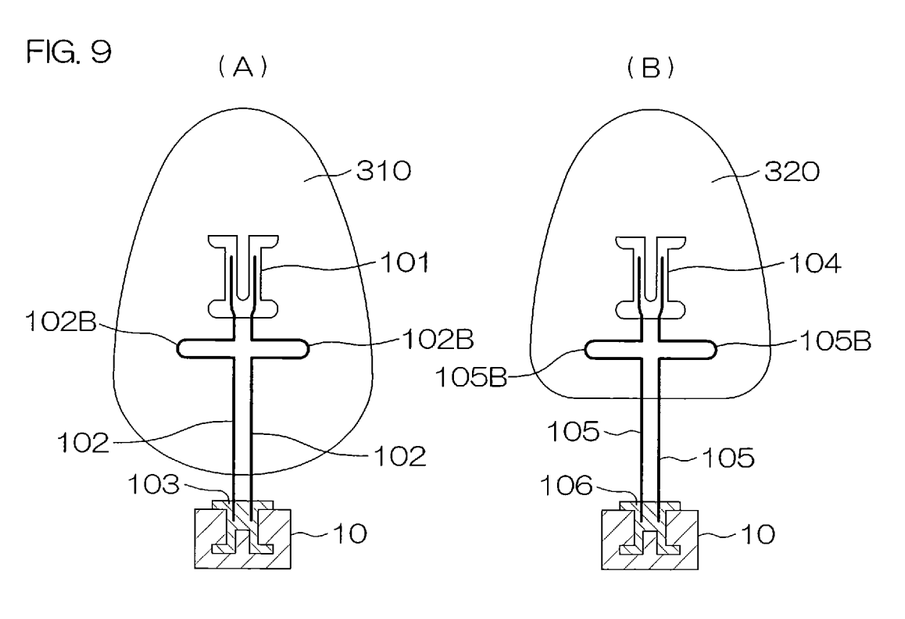
FIG. 9A is a schematic diagram showing a tooth surface pad 310 on the front side (labial side) of a tooth crown in FIG. 8.
FIG. 9B is a schematic diagram showing a tooth surface pad 320 on the back side (lingual side) of the tooth crown in FIG. 8.

FIG. 8 is a schematic diagram showing a sectional surface taken along a line II-II in FIG. 7. FIG. 9A is a schematic diagram showing a tooth surface pad 310 on the front side (labial side) of a tooth crown, and FIG. 9B is a schematic diagram showing a tooth surface pad 320 on a back side (lingual side) of the tooth crown.

Referring to FIGS. 7, 8, 9A and 9B, the movement member 30 for the upper central incisor (first upper right tooth) includes a set of two tooth surface pads 310, 320 (a pair of tooth surface pads 310, 320) conforming to the tooth crown surface of the first upper right tooth. One end of a metal resilient member 102 is fixed to the outer surface of the tooth surface pad 310 by a resilient member attachment portion 101. Further, the other end of the metal resilient member 102 is fixed to the base portion 10 by a resilient member attachment portion 103. The metal resilient member 102 includes a pair of metal wires 102 having laterally symmetrical shapes by way of example. The metal wires 102 provided in pair may each have a buffer bent portion 102B which is formed as projecting laterally at a longitudinally middle portion thereof by bending the metal wire forth and back.

Similarly, one end of a metal resilient member 105 is fixed to the outer surface of the tooth surface pad 320 by a resilient member attachment portion 104, and the other end of the metal resilient member 105 is fixed to the base portion 10 by the resilient member attachment portion 106. Similarly to the metal resilient member 102, the metal resilient member 105 may include a pair of metal wires 105 having laterally symmetrical shapes and each having a buffer bent portion 105B at a longitudinally middle portion thereof.

The tooth surface pads 310, 320 are supported in predetermined positions and orientations with respect to the base portion 10 by the metal resilient members 102, 105, respectively. More specifically, the tooth surface pads 310, 320 are supported so as to conform to the post-movement position, orientation and state of the tooth crown of the first upper right tooth.

When the movement member 30 according to this embodiment is fitted on the tooth crown surface of the first upper right tooth, the orthodontic force and the gripping force are constantly applied by the metal resilient members 102, 105 so that the tooth surface pads 310, 320 conform to the post-movement position and orientation of the tooth crown. Therefore, the orthodontic force and the gripping force can be continuously properly applied to the tooth (first upper right tooth) intended to be moved by the resilience of the metal resilient members 102, 105.

Further, the metal resilient members 102, 105 may be formed of a resilient material including a shape memory alloy. In this case, the metal resilient members 102, 105 are deformed so as to expand a space between the tooth surface pads 310, 320, for example, by cooling the appliance 2 with cold water, making it easier to fit the appliance 2 on the tooth arch. After the attachment, the metal resilient members 102, 105 are restored to their original shapes in the patient's mouth by body temperature, and the predetermined orthodontic force and the predetermined gripping force are generated by the tooth surface pads 310, 320.

When the appliance is to be detached, cold water is put in the patient's mount. Thus, the metal resilient members 102, 105 are deformed for easier detachment of the appliance.

Figure 10:
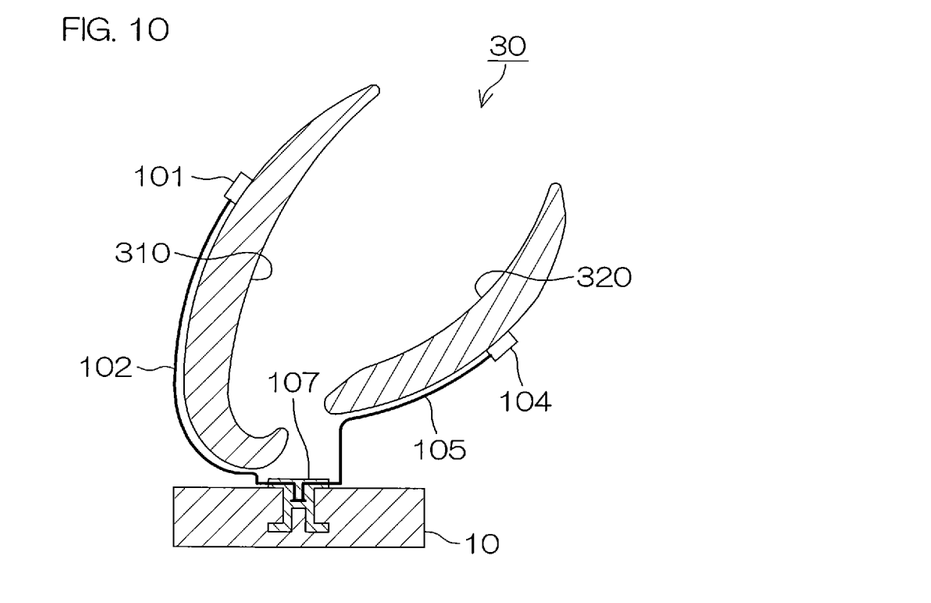
FIG. 10 is a schematic diagram showing an exemplary modification of the orthodontic appliance 2 of FIG. 8 in section.

As shown in FIG. 10, the movement member 30 may be configured so that the metal resilient members 102, 105 are fixed to the base portion 10 by a common resilient member attachment portion 107. In FIG. 10, like components are denoted by like reference numerals as in FIG. 8, and duplicate description will be omitted.

In the embodiment described above, the metal resilient members 102, 105 each include the pair of metal wires 102, 105 by way of example, but are not limited to this arrangement. The metal resilient members 102, 105 may be in the form of resilient wires, in the form of plates such as plate springs, in the form of coil springs, or in any other form, as long as they can constantly resiliently apply the orthodontic force and the gripping force to the tooth surface pads 310, 320.

Further, the entire surfaces of the metal resilient members may be coated with a nonmetal material so that alloy portions thereof are not exposed. Where the appliance is produced with the metal resilient members thus coated with the nonmetal material, even a patient having metal allergy can use the appliance without any trouble.

Further, plural types of metal resilient members containing the shape memory alloy and standardized as having different shapes, different lengths, different sizes and different resilient forces may be prepared. The appliance 2 can be more easily produced by designing the attachment positions of the metal resilient members to the tooth surface pads and the base portion 10 based on the standardization information.

Figure 11:
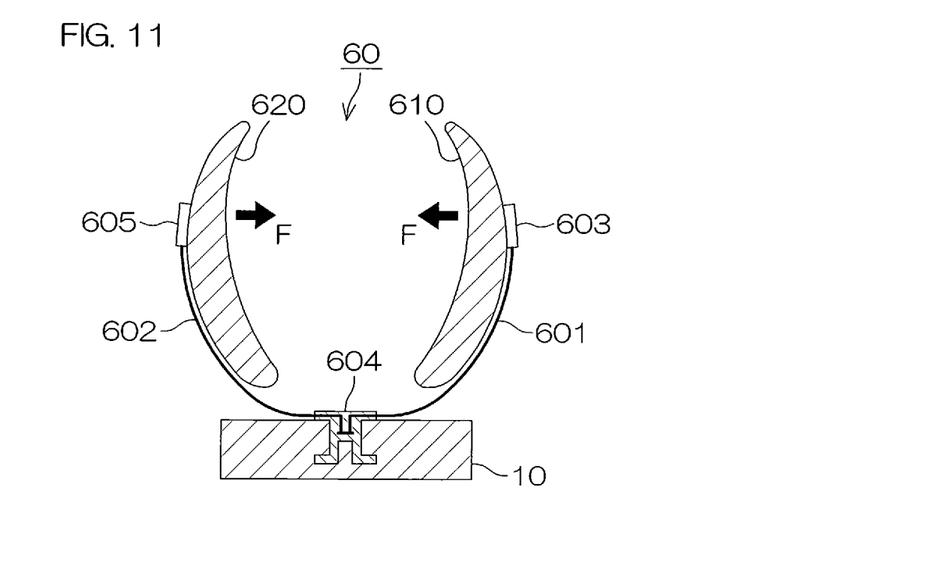
FIG. 11 is a schematic diagram showing a sectional surface taken along a line III-III in FIG. 7.

FIG. 11 is a schematic diagram showing a sectional surface taken along a line III-III in FIG. 7.

Referring to FIGS. 7 and 11, a portion of the gripping member 60 which grips the sixth upper left tooth (upper left first molar) includes two tooth surface pads 610, 620 (a pair of tooth surface pads 610, 620) conforming to the tooth crown surface of the sixth upper left tooth. The tooth surface pad 610 is a pad which abuts against the sixth upper left tooth from the outer side (buccal side) to cover an outer side portion of the tooth crown surface of the sixth upper left tooth. The tooth surface pad 620 is a pad which abuts against the sixth upper left tooth from the inner side (lingual side) to cover an inner side portion of the tooth crown surface of the sixth upper left tooth.

In this embodiment, as shown in FIG. 7, the tooth surface pads 610, 620 are not each provided in the form of independent single pad, but are respectively connected to tooth surface pads conforming to the tooth crown surface of the neighboring seventh upper left tooth (upper left second molar) and then to tooth surface pads conforming to the tooth crown surface of the neighboring eighth upper left tooth (upper left third molar).

One end of a metal resilient member 601 is fixed to the outer surface of the tooth surface pad 610 by a resilient member attachment portion 603. The other end of the metal resilient member 601 is fixed to the base portion 10 by a resilient member attachment portion 604. Similarly, one end of a metal resilient member 602 is fixed to the outer surface of the tooth surface pad 620 by a resilient member attachment portion 605, and the other end of the metal resilient member 602 is fixed to the base portion 10 by the resilient member attachment portion 604. The metal resilient member 601 constantly applies an inward resilient force F (leftward resilient force in FIG. 11) to the tooth surface pad 610. Further, the metal resilient member 602 constantly applies an inward resilient force F (rightward resilient force in FIG. 11) to the tooth surface pad 620. Therefore, the sixth upper left tooth is reliably firmly gripped at its position by the tooth surface pads 610, 620 with the outer surface and the inner surface of the tooth crown thereof held between the tooth surface pads 610 and 620.

In this embodiment, the pair of tooth surface pads which holds the neighboring seventh upper left tooth is provided with no metal resilient members, but is capable of generating a reliable and firm gripping force because the resilient forces F applied by the pair of tooth surface pads 610, 620 holding the sixth upper left tooth and the resilient forces applied by the pair of tooth surface pads holding the eighth upper left tooth are transmitted to the tooth surface pads holding the seventh upper left tooth.

Third Embodiment

When an orthodontic force is applied, a counterforce to the orthodontic force is inevitably applied to the orthodontic appliance and then to teeth connected to the appliance. That is, counteraction for detaching the appliance is liable to occur. An occlusal force possibly suppresses the counterforce acting to detach the appliance, and prevents undesired tooth movement. The appliance can be maintained in a proper position and state by the occlusal force and an occlusal position, and properly apply the orthodontic force. Therefore, it is important to properly utilize the occlusal force in order to stably maintain the appliance for excellent orthodontic treatment effect.

Where the conventional mouthpiece type orthodontic appliance is produced, a predictive model is prepared such that teeth are arranged in post-movement positions between the upper and lower jaws with the upper and lower dental arches in occlusion in the patient's mouth. However, the occlusal position of malaligned upper and lower dental arches yet to be subjected to the orthodontic treatment does not always correspond to correct jaw positions in a correct upper and lower jaw relationship. This is because there is a possibility that the occlusal position, i.e., the position of the lower jaw, is displaced due to the tooth malalignment.

The mouthpiece type orthodontic appliance covers the occlusal surfaces of the teeth and, therefore, is generally brought into contact with the occlusal surfaces of molars at an early stage. In addition, the mouthpiece type orthodontic appliance is often liable to contact left and right tooth rows in different manners. In the case of mouthpiece type orthodontic appliances thus each adapted to cover the entire dental arch including the occlusal surfaces, it is generally difficult to properly and evenly apply the occlusal forces to the occlusal surfaces with the upper and lower appliances evenly kept in physiological positions in contact with the entire occlusal surfaces. If the appliances are brought into asymmetrical contact with each other to apply a heavier occlusal force to either the left tooth row or the right tooth row, a depressing force is liable to be applied to the heavily abutting region of the tooth row, so that an occlusal plane between the upper and lower dental arches is liable to be distorted and inclined. Further, the lower jaw position is liable to be displaced from its original position for a stabler bite position. Thus, the mouthpiece type orthodontic appliances can evenly apply the occlusal forces to the entire upper and lower dental arches in a physiological lower jaw position to be thereby maintained in functionally proper positions to provide proper action. This is an important factor for excellent orthodontic treatment effect.

In this embodiment, therefore, the mouthpiece type orthodontic appliance is configured so that the occlusal surface contact position thereof conforms to the physiologically and functionally proper lower jaw position and the occlusal force is evenly applied to the entire occlusal contact surface thereof.

In general, when upper and lower dental arch forms are obtained, a bite registration including the physiological occlusion or the contact position relationship of the upper and lower dental arches in the patient's mouth is taken. However, the physiological lower jaw position, i.e., the physiologically proper positional relationship between the upper and lower dental arches, in such a state that the mouthpiece type orthodontic appliances are fitted in the patient's mouth and kept in contact with each other in positions with the mouth being opened to an extent corresponding to the total thickness of the appliances cannot be determined with the use of the aforementioned occlusal contact information alone.

Therefore, the physiological positional relationship is checked in the patient's mouth, for example, with the mouthpiece type orthodontic appliances actually fitted in the mouth and, based on the positional relationship between the upper and lower jaws observed at this time, the positional relationship between the upper and lower mouthpiece type orthodontic appliances is recorded (the bite registration is taken). More specifically, when the bite registration is taken, the total thickness of the upper and lower mouthpiece type orthodontic appliances is taken into consideration, and the positional relationship between the upper and lower dental arches for the physiological lower jaw position in a correspondingly opened mouth state is recorded by the bite registration.

Based on the physiological bite registration thus taken in the opened mouth state, the occlusal surface position in which the mating surfaces of the upper and lower mouthpiece type orthodontic appliances are in contact with each other (a contact position in which the upper and lower appliances are in contact with each other or either one of the upper and lower appliances is in contact with its mating dental arch) is determined. Where the orthodontic appliances are to be fitted on the upper and lower dental arches, for example, a mating surface portion for the upper jaw and a mating surface portion for the lower jaw are prepared, and respectively attached to the base portions of the orthodontic appliances for the upper and lower jaws. The upper and lower mating surface portions thus respectively attached to the upper and lower mouthpiece type orthodontic appliances are brought into contact with each other, whereby the occlusal forces are evenly applied to the entire upper and lower mouthpiece type orthodontic appliances in the physiologically proper lower jaw position. This makes it possible to reliably suppress the counteraction antagonistic to the orthodontic forces and more reliably achieve the desired tooth movement while maintaining the upper and lower orthodontic appliances in proper positions.

The third embodiment will hereinafter be described more specifically with reference to the drawings.

Figure 12:
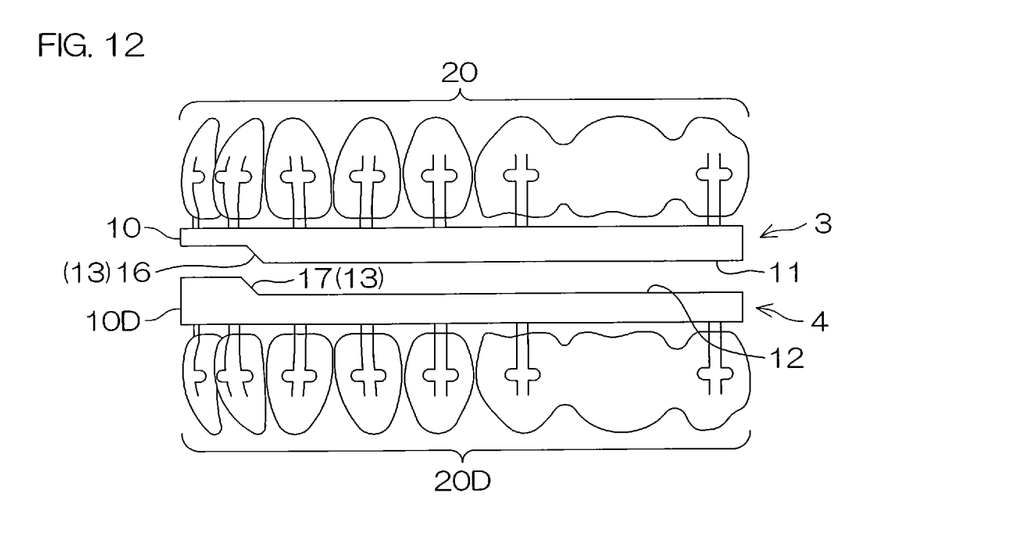
FIG. 12 is a side view of mouthpiece type removable orthodontic appliances 3, 4 according to further another embodiment.

FIG. 12 is a side view showing mouthpiece type removable orthodontic appliances 3, 4 according to further another embodiment. The orthodontic appliances include an orthodontic appliance 3 to be fitted on a permanent dental arch of an upper jaw, and an orthodontic appliance 4 to be fitted on a permanent dental arch of a lower jaw.

The orthodontic appliance 3 for the upper jaw basically includes a base portion 10 and a fitting portion 20 similarly to the orthodontic appliance 1 described with reference to FIG. 1 and/or the orthodontic appliance 2 described with reference to FIG. 7. The fitting portion 20 has substantially the same construction as in the embodiments described above.

The orthodontic appliance 4 for the lower jaw also basically includes a base portion 10D and a fitting portion 20D similarly to the orthodontic appliance 1 described with reference to FIG. 1 and/or the orthodontic appliance 2 described with reference to FIG. 7. The fitting portion 20D is fitted on the permanent dental arch of the lower jaw for the orthodontic treatment.

Figure 13:
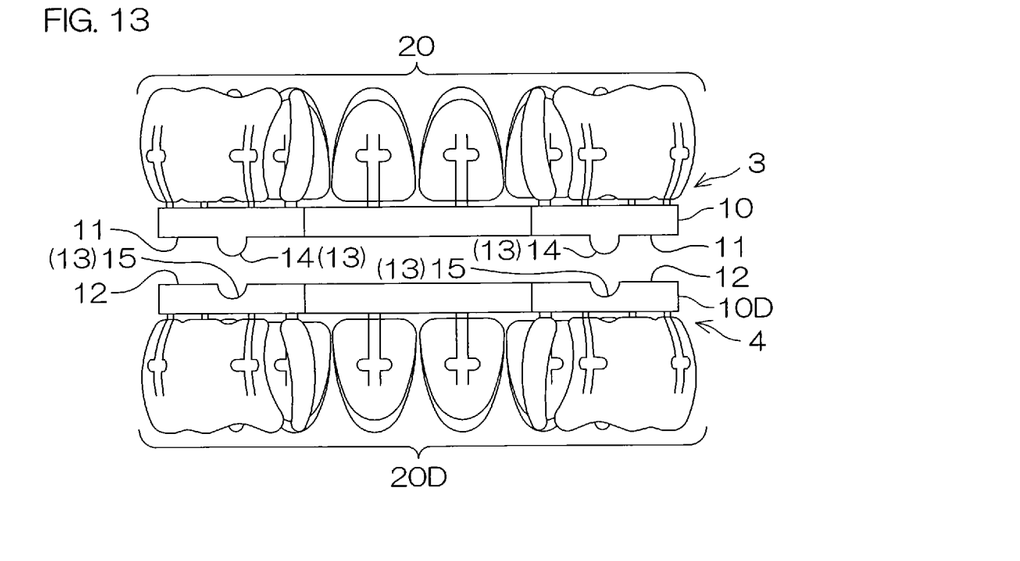
FIG. 13 is a schematic diagram showing the mouthpiece type removable orthodontic appliances 3, 4 of FIG. 12 as viewed from the back side.

FIG. 13 is a diagram showing the orthodontic appliances 3, 4 of FIG. 12 as viewed from the back side (as viewed from the right side in FIG. 12). In FIG. 13, an engagement configuration 13 (a projection 14 and a recess 15) are illustrated in extreme exaggeration for easy understanding.

Referring to FIGS. 12 and 13, a feature of this embodiment is that the occlusal surface 11 of the base portion 10 and the occlusal surface 12 of the base portion 10D are provided with the engagement configuration 13 for proper abutment of the occlusal surfaces 11, 12. For example, the engagement configuration 13 may include projections 14 provided on the occlusal surface 11 and recesses 15 provided in the occlusal surface 12 for engagement with the projections 14. Alternatively, the engagement configuration 13 may include a step 16 provided on the occlusal surface 11 and a step 17 provided on the occlusal surface 12 for engagement with the step 16.

The engagement configuration 13 is merely required to be capable of reproducing a bite registration taken with the mouthpiece type orthodontic appliances 3, 4 actually fitted in the patient's mouth in abutment against each other (in occlusion with each other) to ensure the physiologically proper positional relationship between the upper and lower jaws.

Particularly, where the engagement configuration 13 includes the step 16 and the step 17 as described above, a bite registration may be taken in a desired laterally symmetrical position to which the lower jaw is guided forward from its original position, and the mating surface portions may be defined in that position for the orthodontic treatment during a growth period. Thus, the lower jaw is guided forward every time the orthodontic appliances occlude with each other. The orthodontic appliances can be applied to orthognathic treatment for promoting the forward growth of the lower jaw.

FIGS. 14A to 14C are diagrams showing an embodiment in which an optional member is incorporated in the upper jaw orthodontic appliance 3 described with reference to FIGS. 12 and 13. FIG. 14A is a side view of the orthodontic appliance 3 including the optional member. FIG. 14B is a diagram of the orthodontic appliance 3 including the optional member as viewed from the rear side (back side). FIG. 14C is a perspective view of the orthodontic appliance 3 with a side cover attached thereto.

As shown in FIG. 14A, attachment portions 71 for attaching a side cover 70 may be provided as the optional member on the base portion 10 of the orthodontic appliance 3. Specifically, the attachment portions 71 may be disposed in predetermined spaced relation on the outer side surface of the base portion 10. For example, the attachment portions 71 may be buttons or snaps. The attachment portions 71 may be embedded in the outer side surface of the base portion 10.

As shown in FIG. 14B, the attachment portions 71 for attaching the side cover 70 may be provided as the optional member on the inner side surface and/or the rear side surface of the base portion 10 of the orthodontic appliance 3.

The side cover 70 is adapted to cover the outer side surface (labial and buccal sides) or the inner side surface (lingual side) of the fitting portion 20 of the orthodontic appliance 3 or both the outer side surface and the inner side surface of the fitting portion 20. The side cover 70 is formed, for example, of an elastic material such as silicone. The side cover 70 attached to the attachment portions 71 can prevent the patient's lips, buccal mucosa and tongue surface from being brought into direct contact with the fitting portion 20.

The side cover 70 has reception portions 72 to be engaged with the attachment portions 71 provided on the outer side surface and/or the inner side surface of the base portion 10. The side cover 70 can be attached to and detached from the base portion 10 as needed by engaging and disengaging the attachment portions 71 with respect to the reception portions 72.

FIG. 14C is a schematic perspective view of the orthodontic appliance with the side cover 70 attached thereto. As shown in FIG. 14C, the side cover 70 may cover all of the outer side surface, the rear side surface and the inner side surface of the fitting portion 20, or may cover either the outer side surface or the inner side surface of the fitting portion 20. Alternatively, the side cover may be adapted to partly cover either the outer side surface or the inner side surface of the fitting portion 20.

Patterns 73 are drawn on the outer surface of the side cover 70 shown in FIG. 14C. Thus, the designability of the side cover 70 may be improved by providing a picture, a pattern or a color painting on the side cover 70.

Figure 15:
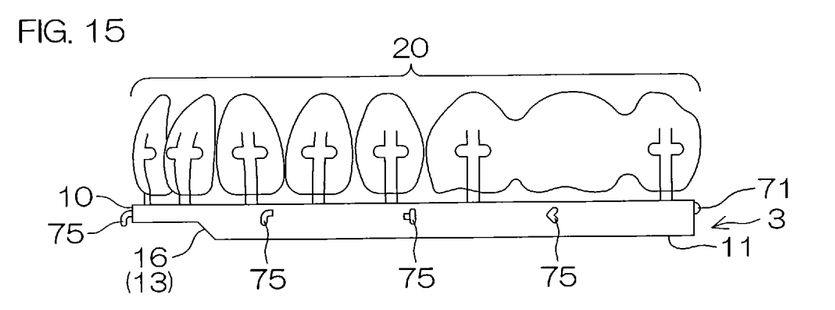
FIG. 15 is a side view showing an embodiment including another optional member incorporated in the orthodontic appliance 3 for the upper jaw.

FIG. 15 is a side view showing an embodiment in which another optional member is incorporated in the upper jaw orthodontic appliance 3 described with reference to FIG. 12. The orthodontic appliance 3 shown in FIG. 15 includes hooks 75 provided at predetermined positions on the outer side surface of the base portion 10 as the optional member for hooking rubber members, wires or strings by way of example. With the orthodontic appliance 3 fitted on the upper jaw dental arch, the hooks 75 are utilized to suppress a counterforce acting to detach the orthodontic appliance 3. That is, for example, one-side ends of the rubber members are respectively hooked to the hooks 75 and the other-side ends of the rubber members are hooked to an external fixation device, a bone anchorage or the like, whereby the counterforce acting to detach the orthodontic appliance 3 is suppressed by the resilient force of the rubber members.

Various modifications are conceivable for the positions and the shapes of the hooks 75 to be provided on the outer side surface of the base portion 10, as long as it is possible to reliably fix the orthodontic appliance 3 while improving the orthodontic effect.

Figure 16:
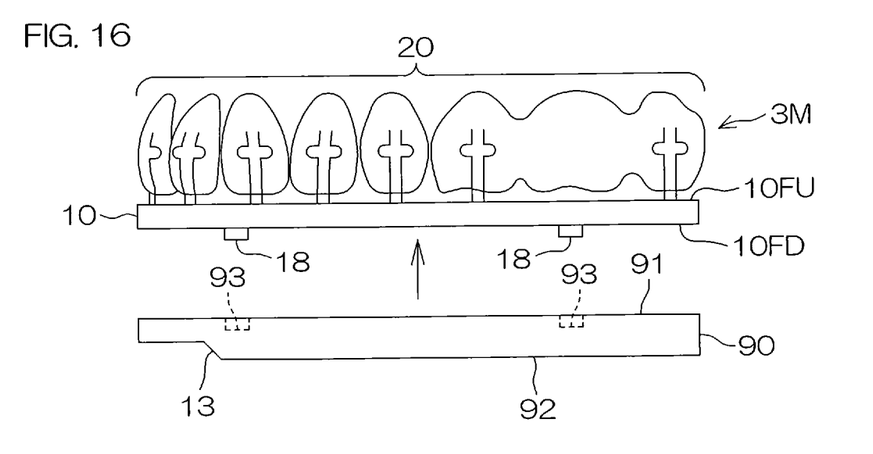
FIG. 16 is a side view showing an orthodontic appliance 3M which is an exemplary modification of the mouthpiece type removable orthodontic appliance 3.

FIG. 16 is a side view showing an orthodontic appliance 3M to be fitted on a permanent tooth arch of an upper jaw as an exemplary modification of the mouthpiece type removable orthodontic appliance 3 described with reference to FIGS. 12 and 13.

The orthodontic appliance 3M for the upper jaw basically includes a base portion 10 and a fitting portion 20 similarly to the orthodontic appliance 3 described above, the orthodontic appliance 1 described with reference to FIG. 1 and/or the orthodontic appliance 2 described with reference to FIG. 7. The fitting portion 20 has the same construction as in the embodiments described above.

A feature of this embodiment is that the base portion 10 has a fitting surface 10FU to which the fitting portion 20 is attached and an occlusal surface 10FD opposite from the fitting surface 10FU. An occlusal surface member 90 is removably attached to the occlusal surface 10FD. The occlusal surface member 90 is a thin plate having a U-shape (horseshoe shape) conformal to the base portion 10 and extending along the shape of the occlusal surface of the permanent dental arch of the upper jaw as seen in plan. The upper surface 91 of the occlusal surface member 90 is formed so as to be in close contact with the occlusal surface 10FD of the base portion 10. The upper surface 91 of the occlusal surface member 90 and the occlusal surface 10FD of the base portion 10 are respectively provided with attachment portions 93, 18 for positioning the occlusal surface member 90 and the base portion 10 with respect to each other for attachment and preventing displacement of the occlusal surface member 90 and the base portion 10 after the attachment. The attachment portions 93, 18 may each include a plurality of attachment portions, and the attachment portions 93, 18 may be, for example, recesses and projections to be engaged with the recesses.

An engagement configuration 13 is provided on the lower surface 92 of the occlusal surface member 90 for the occlusion of the orthodontic appliance 3M in a physiologically proper position with the occlusal surface member 90 attached to the base portion 10. The engagement configuration 13 may be provided in the form of projections, recesses or a step on the lower surface 92 as in the preceding embodiment.

In this embodiment, the occlusal surface 10FD is defined on the base portion 10, and the occlusal surface member 90 is removably attached to the occlusal surface 10FD for the following reason.

Where the jaw position sampled in the patient's mouth is incorrect or where the jaw position does not correspond to the physiological position but a habitual position, the orthodontic appliance is often required to be modified while being monitored during use. In such a case, it is desirable to newly form only the occlusal surface and replace the former occlusal surface with the new one without producing the entire orthodontic appliance again. In this case, a bite registration is newly taken to determine a positional relationship between the upper and lower mouthpiece type orthodontic appliances or a positional relationship between either of the mouthpiece type orthodontic appliances and a mating dental arch model. Then, an occlusal surface member filling a space between the occlusal surfaces of the mouthpiece type orthodontic appliances or between the occlusal surfaces of either of the mouthpiece type orthodontic appliances and the mating dental arch model is newly prepared based on the positional relationship, and the former occlusal surface member is replaced with the new one. Even if the occlusal surface member is prepared again and again, the provision of the attachment portions makes it possible to position the base portion (occlusal surface 10FD) of the mouthpiece type orthodontic appliance and the occlusal surface member 90 in the proper positional relationship based on the attachment portions, and finally locate the mouthpiece type orthodontic appliance in the correct position.

Figure 17:
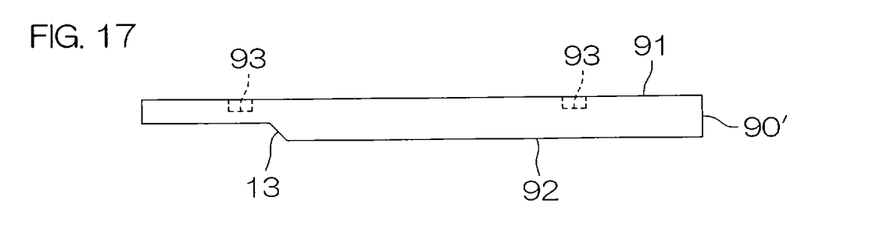
FIG. 17 is a schematic side view of an occlusal surface member 90' which can be used in place of an occlusal surface member 90.

FIG. 17 is a schematic side view of an occlusal surface member 90' which can be used in place of the occlusal surface member 90. In FIG. 17, like reference characters denote like components as in the preceding embodiment, and duplicate description will be omitted.

Figure 14:
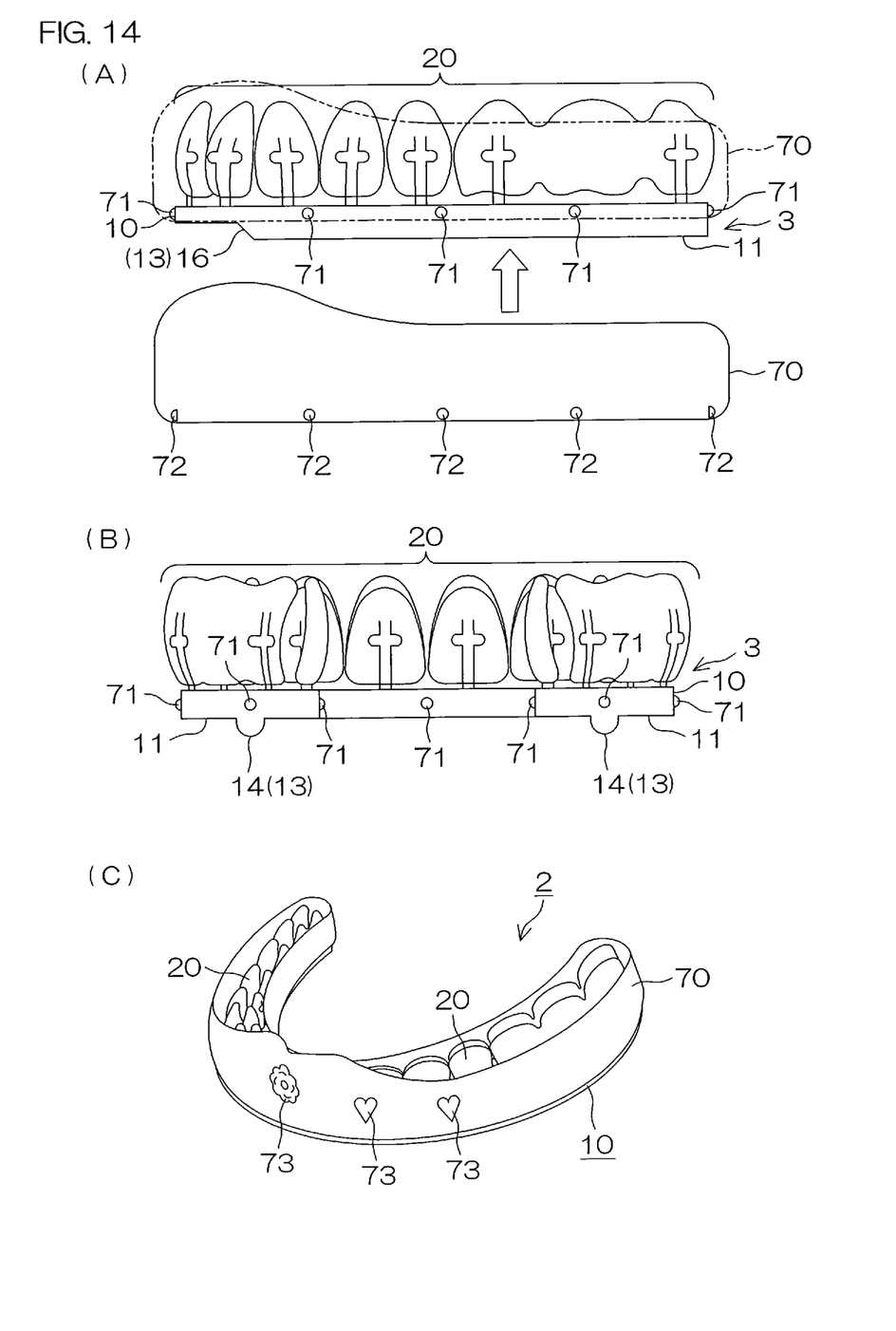
FIGS. 14A to 14C are diagrams showing an embodiment including an optional member incorporated in the orthodontic appliance 3 for an upper jaw, respectively showing a side view of the orthodontic appliance 3, a rear view of the orthodontic appliance 3, and a perspective view of the orthodontic appliance 3 with a side cover attached thereto.

In the embodiments described with reference to FIGS. 16 and 17, the attachment portions 71 (e.g., buttons or snaps) and the hooks 75 may be provided as the optional member on the side surface of the base portion 10 or the side surface of the occlusal surface member 90, 90' as in the embodiments described with reference to FIGS. 14 and 15.

The present invention is not limited to the embodiments described above, but various modifications may be made within the scope of the appended claims.

This application corresponds to Japanese Patent Application No. 2020-096976 filed to Japan Patent Office on Jun. 3, 2020, the disclosure of which is entirely incorporated herein by reference.

REFERENCE SIGNS LIST 1, 2, 3, 3M, 4: Mouthpiece type removable orthodontic appliance
10, 10D: Base portion
10FU: Fitting surface
11, 12, 10FD: Occlusal surface
13: Engagement configuration
14: Projection
15: Recess
16, 17: Step
20, 20D: Fitting portion
30, 40: Movement member
31, 32, 41, 42: Tooth surface pad
33, 34, 37: Support member
18, 35, 36, 38, 93: Attachment portion
50, 60: Gripping member
70: Side cover
71: Attachment portion
72: Reception portion
73: Pattern
75: Hook
90, 90': Occlusal surface member
91: Upper surface
92: Lower surface
101, 103, 104, 106, 603, 604, 605: Resilient member attachment portion
102, 105, 601, 602: Metal resilient member
310, 320, 610, 620: Tooth surface pad

What is claimed is:

1. A removable orthodontic mouthpiece appliance configured based on digital three-dimensional information representing a patient's dental arch form, the removable orthodontic mouthpiece appliance comprising:
    a base portion; and
    a fitting portion provided on the base portion;
    wherein the base portion is a thin plate formed of an inelastic material and having a U-shaped planar contour configured to extend along a shape of an occlusal surface of a dental arch of a jaw on which the orthodontic appliance is to be worn;
    wherein one surface of the base portion, configured to oppose the dental arch, is a U-shaped mounting surface that is horizontally flat, and an opposite surface of the base portion constitutes an occlusal surface;
    wherein the fitting portion comprises a movement member configured for fitting on a tooth intended for movement, and a gripping member configured for fitting on a tooth unintended for movement;
    wherein the movement member comprises:
        a pair of orthodontic tooth surface pads configured to conform to a post-movement position and condition of a crown surface of the tooth intended for movement and to cover both a buccal side and a lingual side of the crown of the tooth intended for movement; and
        an orthodontic resilient member configured for attaching the pair of orthodontic tooth surface pads to the base portion so that the pair of orthodontic tooth surface pads protrude from the horizontally flat mounting surface of the base portion in directions intersecting the horizontally flat mounting surface, and for applying an orthodontic force and a gripping force to the pair of orthodontic tooth surface pads with respect to the base portion;

wherein the gripping member comprises:
- a pair of gripping tooth surface pads configured to conform to a crown surface of of the tooth unintended for movement and to cover both a buccal side and a lingual side of the crown of the tooth unintended for movement; and
- a gripping resilient member configured for attaching the pair of gripping tooth surface pads to the base portion so that the pair of gripping tooth surface pads protrude from the horizontally flat mounting surface of the base portion in directions intersecting the horizontally flat mounting surface, and for applying a gripping force to the pair of gripping tooth surface pads with respect to the base portion.

2. The removable orthodontic mouthpiece appliance according to claim 1,
wherein the orthodontic resilient member is integral with the pair of orthodontic tooth surface pads,
wherein the gripping resilient member is integral with the pair of gripping tooth surface pads.

3. The removable orthodontic mouthpiece appliance according to claim 1, wherein the orthodontic resilient member comprises a resilient member of an alloy material.

4. The removable orthodontic mouthpiece appliance according to claim 3, wherein the orthodontic resilient member comprises a shape memory alloy having a resilience.

5. The removable orthodontic mouthpiece appliance according to claim 1, wherein the gripping resilient member comprises a shape memory alloy having a resilience.

6. The removable orthodontic mouthpiece appliance according to claim 3, wherein the orthodontic resilient member and the gripping resilient member are each surface-coated with a nonmetal material so as to prevent an alloy portion from being exposed.

7. The removable orthodontic mouthpiece appliance according to claim 1, wherein the base portion is provided with an attachment portion for attaching a side cover and/or a hook for hooking a rubber member or a wire.

8. The removable orthodontic mouthpiece appliance according to claim 1,
wherein the occlusal surface has an engagement configuration for occlusion of the orthodontic appliance.

9. The removable orthodontic mouthpiece appliance according to claim 1, further comprising
an occlusal surface member configured for removable attachment to the occlusal surface and having an engagement configuration for occlusion of the orthodontic appliance.

* * * * *